Jan. 6, 1959  H. RUSKIN  2,866,973
ELECTRIC STAPLING MACHINE
Filed March 12, 1956  9 Sheets-Sheet 1

INVENTOR.
Henry Ruskin
BY
ATTORNEY

Jan. 6, 1959

H. RUSKIN

2,866,973

ELECTRIC STAPLING MACHINE

Filed March 12, 1956

INVENTOR.
Henry Ruskin

BY

*Cm Palmer*
ATTORNEY

Jan. 6, 1959

H. RUSKIN 2,866,973

ELECTRIC STAPLING MACHINE

Filed March 12, 1956

INVENTOR.
Henry Ruskin

ATTORNEY

INVENTOR.
Henry Ruskin

Jan. 6, 1959  H. RUSKIN  2,866,973
ELECTRIC STAPLING MACHINE
Filed March 12, 1956  9 Sheets-Sheet 8

INVENTOR.
Henry Ruskin
BY
ATTORNEY

United States Patent Office 2,866,973
Patented Jan. 6, 1959

2,866,973

ELECTRIC STAPLING MACHINE

Henry Ruskin, Bayside, N. Y., assignor, by mesne assignments, to Patents Management Corporation, Atlanta, Ga., a corporation of Georgia Application March 12, 1956, Serial No. 570,860

17 Claims. (Cl. 1—3)

This invention is a stapling machine and specifically relates to an electric stapling machine wherein a cap depressible relative to a swingable cover constitutes normally raised plunger means including a driving blade for expelling the foremost staple of a staple strip out of a staple containing open top magazine when closed by and removably interlocked with the cover which is adapted when unlocked from the magazine to be bodily swung with the cap rearwardly relative to the magazine to fully open the latter for prompt loading of the staple strip therein. One object of the invention resides in pivotally carrying the cap, cover and magazine intermediate of a one piece hollow casing which includes a forwardly extending base having anvil means cooperating to clinch the foremost staple ejected by the driving blade from the magazine. Another object is realized in the provision of a solenoid pivotally sustained within the hood of the casing and including an armature having its lower part pivotally associated with the rear end of an intervenor or intervenor including spaced front jaws removably engageable with the pivoted cap for depressing the plunger means relative to the cover and magazine to eject the foremost staple from the magazine. Another object is to provide means cooperating with the casing for pivotally supporting the intervenor intermediate the length thereof whereby the relatively light downwardly directed hand pressure by the operator necessary to start the cycle of operation, i. e., the initial manual impact applied to the cap is transmitted to the intervenor which in turn is pivoted to operate switch closing means to establish a closed electric circuit to energize the solenoid to effect subsequent automatic pivotal displacement of the intervenor in the same direction for downwardly displacing the spaced jaws against spaced posts of the cap for continuing the driving stroke of the driving blade. Another object is to utilize the intervenor to swingably carry a spring controlled trigger which is adapted to actuate a swingable cam promptly and immediately after the manual impact is applied to the cap for automatically operating switch means to close the electric circuit containing the solenoid for subsequent automatic operation of the intervenor to effect desired continuing downward displacement of the driving blade. Another object is to provide effective means to automatically disable the electrical circuit containing the solenoid towards the completion of the downward stroke of the driving blade. Another object resides in the provision of reliable means to advance or retard establishing of the electrical circuit containing the solenoid to compensate for controllable manufacturing tolerances in the various parts of the stapling machine herein and thereby provide means promptly responsive to establish the electrical circuit immediately pursuant to the initial manual impact on the cap. Another object is to also slidably guide the intervenor whereby the latter may be linearly displaced to withdraw the spaced jaws thereof from engagement with the spaced posts of the swingable cap, thereby permitting the latter to be swung upwardly and rearwardly away from the magazine and carry with it the cover and concomitantly automatically shifting the staple pusher or follower rearwardly for fully opening the magazine. Another object is concerned with automatically and operatively engaging the posts of the swingable cap with the spaced jaws of the pivotal and slidable intervenor on the completion of the swingable movement of the cover towards the magazine to close the latter.

Another object resides in the provision of a novel casing having novel transversely alined spaced means also spaced lengthwise of but within the casing and forwardly of the hood to locate the fulcrum pin for the swingable and slidable intervenor and the fulcrum pin traversing the cap, cover and magazine, and thereafter maintaining such located and longitudinally spaced fulcrum pins by keeper means removably held within the casing. Another object deals with the provision of a depressible manipulator carried by the hood of the casing for pivotally displacing the suspended solenoid within the hood to disengage or withdraw the bifurcated jaws of the swingable and slidable intervenor from the spaced posts of the swingable cap to permit the latter to be fully opened. Another object is to provide locking means carried by the keeper and cooperating with the tail portion of the swingable cap to prevent accidentally closing of the latter when fully opened.

Another object is to provide a one piece hollow metal casing wherein spaced cheeks are intermediate the base and hood thereof but above the level of the base and below the top part of the hood and flanking forwardly of the latter although forming a channel for movably receiving and guiding the pivoted staple containing arm formed by the magazine, cover and the cap to permit the forward part of this staple containing arm to normally and appreciably overhang the base above a staple clinching anvil as desired. Other important, general and specific objects and functional and structural features of the invention will be apparent from the following detailed specification taken with the accompanying drawings wherein:

Figure 5:
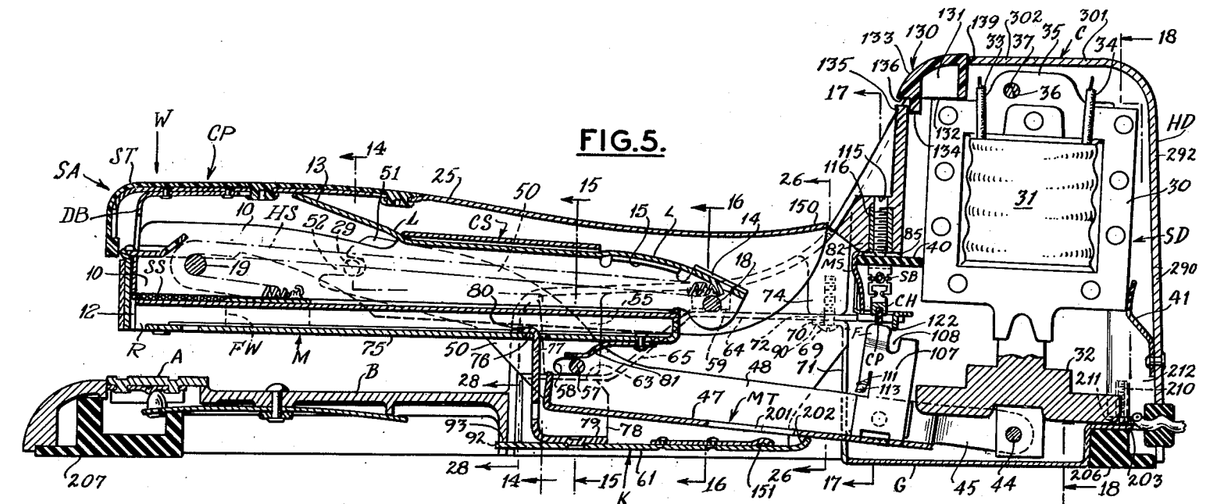
Fig. 5 is an enlarged longitudinal sectional view substantially on the line 5—5 of Fig. 2 illustrating the staple driving blade carried by the cap in its normally raised position.
Figures 9, 25:
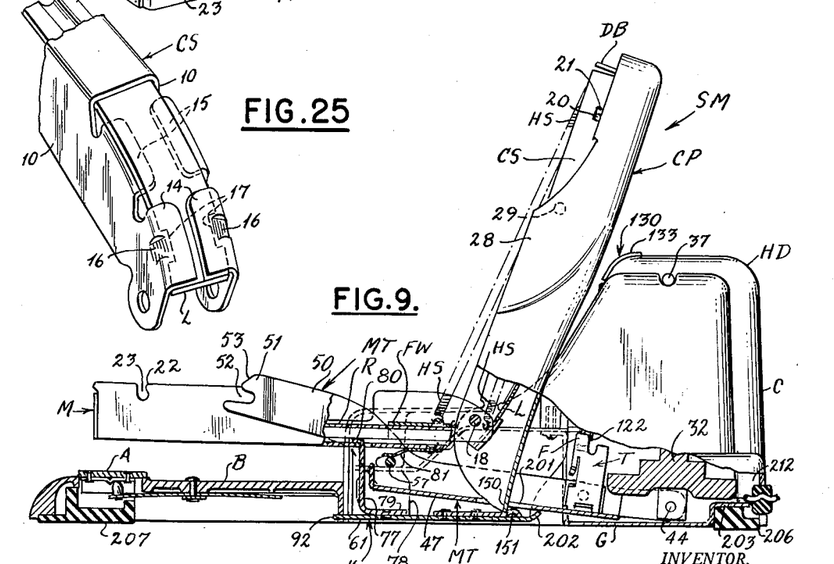
Fig. 9 is a side elevational view of the herein electric stapling machine, shown partly in section and partly broken away to illustrate the cap swung to its opened position at which time the tail end of the cover is held locked against accidental closing.
Fig. 25 is an enlarged and fragmentary perspective view of the swingable cover to which the rear end of the leaf spring which holds the cap normally elevated is anchored.

Referring to the drawings, the electric stapling machine broadly designated SM, comprises inter alia, the die cast hollow casing C integral with anvil carrying base B; and the staple containing arm SA which includes the open top staple receiving magazine M, cover CS, and cap CP. Spaced sides 10 of cover CS are removably received within the magazine and between the spaced sides 11 thereof to close the magazine and to prevent upward displacement of the staple strip SS mounted on rail R fixedly held in the magazine M. Cap CP appropriately and bodily carries the staple driving blade DB for ejecting the foremost staple of the strip SS out of the raceway 12 at the front end of the magazine. Free end 13 of the offset leaf cantilever spring L normally holds cap CP raised as illustrated in Fig. 5. Since blade DB is fixed to cap CP, the latter is also held normally raised. The rear end of spring L is seated on spaced lips 15 of cover CS (Fig. 25) and is effectively anchored under retaining lips 14 by indents 16 (also note Fig. 16) entering notches 17 interrupting spring L.

Figure 16:
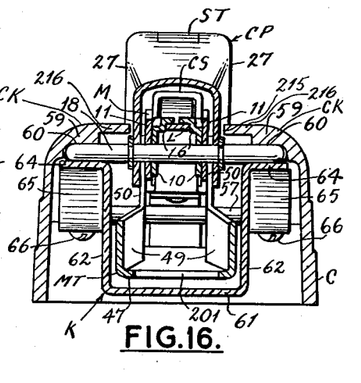

The rear ends of sides 10 of case CS, of sides 27 cap CP, and of sides 11 of magazine M are effectively rotatably retained on fulcrum pin 18 (Fig. 16). Trained over slidably guided roller 19 is the helical spring HS having its ends effectively retained by the slidably guided follower FW and at the rear end of spring L.

Figures 7, 11:
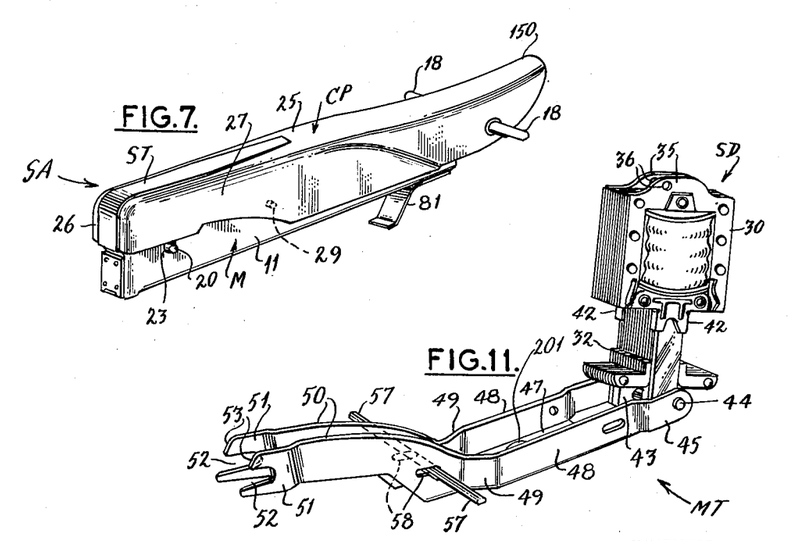
Fig. 7 is a perspective view of the swingable staple containing arm shown closed.
Fig. 11 is a perspective view of the swingable and slidable intervenor pivotally associated with the solenoid laminated armature, and with the trigger thereof removed.
Figures 8, 13:
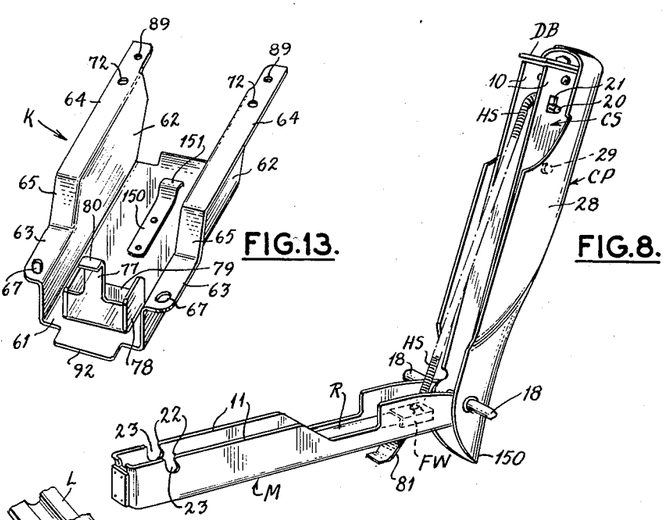
Fig. 8 is a perspective view of the stapling containing arm shown open, namely, with the cap and cover bodily swung rearwardly away from the magazine to permit convenient loading of a staple strip through the open top of the latter.
Fig. 13 is a perspective view of the keeper or restrainer.
Figure 8A:
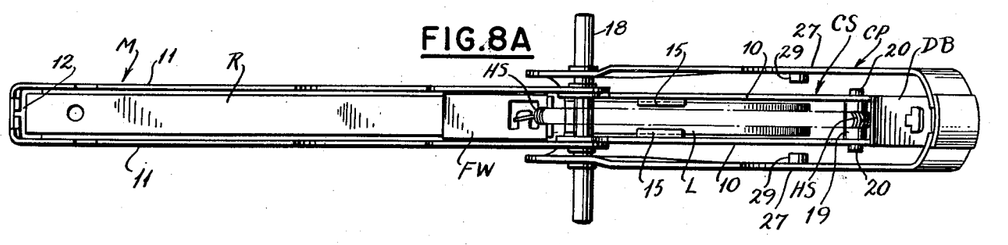
Fig. 8A is a plan view of Fig. 8 and illustrating the slidable follower at the rear end of the magazine.
Figure 14:
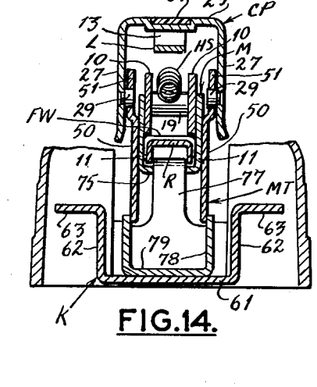
Figs. 14, 15 and 16 are transverse sectional views substantially along the lines 14—14, 15—15 and 16—16 of Fig. 5.

Roller 19 (Figs. 8 and 8A) is movably guided between spaced sides 10 of cover CS and includes reduced portions or pins 20 slidably guided in slots 21 interrupting sides 10. When cap CP is swung downwardly to close the magazine, pins 20 of roller 19 coact with the alined cam portions 22 to initially extend spring HS and thereafter pins 20 are received in the alined notches 23 and interlock with cam portions 22 to hold sides 10 within magazine M just slightly above the staple strip SS. Cap CP is a one piece hollow sheet metal member to which is effectively secured the ornamental strip ST to the top wall 25 and front wall 26 (Fig. 7). Side walls 27 of cap CP straddle spaced sides 10 of case CS and the spaced sides 11 of the magazine. Appropriately anchored to spaced sides 27 of the cap CP are the transversely alined posts 29 (Figs. 8A and 14). The stapling containing arm SA so far described generally follows substantially the type illustrated in my U. S. Patent No. 2,682,053, except that the herein electrical stapling machine SM includes a relatively long hinge or fulcrum pin 18 extending appreciably beyond the sides of cap CP. Swingably disposed within the hollow hood HD of casing C is the solenoid SD, comprising the laminated metal core 30, coil 31, and the laminated metal stepped armature 32. Wires 33 and 34 (Figs. 5 and 12) of coil 31 are effectively electrically connected to solenoid coil 31.

Spaced ears 35 (Figs. 5 and 18) extend from the upper part of core 30. These ears are provided with alined openings 36 which are disposed laterally, that is, to one side of the transverse vertical axial plane of the core 30. Fulcrum pin 37 is appropriately held within the transversely alined openings 38 interrupting the upper part of the dome HD. Spaced ears 35 are rotatably mounted on fulcrum pin 37 and since the latter is eccentrically disposed in respect to solenoid SD, the latter is suspended obliquely, that is, hangs on a bias and normally leans in a direction towards the rear end of cap CP. Such tilting however is limited by core 30 abutting the insulating switch support or mount 40 of the microswitch generally denoted MC (Fig. 17E). Such action is aided by the offset leaf spring 41 having its lower end suitably anchored to casing C. The solenoid per se is of the conventional type and includes U-shaped rails 42 for slidably guiding armature 32.

Lower spaced parts of armature 32 terminate in ears 43 fixedly retaining fulcrum pin 44 on which rear offset terminals 45 of the U-shaped intervenor MT are effectively rotatably mounted. Thus armature 32 swingably sustains the rear end of intervenor MT which comprises a bottom wall 47 having the upstanding spaced sides 48 including the forwardly converging portions 49 from which project the spaced extensions 50 including terminal bifurcated nose portions or jaws 51 having alined notches 52 and having cam faces 53. Nose portions 51 are outwardly offset relative to extensions 50 (Fig. 11) and spaced posts 29 are received in the alined notches 52 to hold cap CP removably engaged with the intervenor MT (Figs. 3 and 4) to hold the cover CS closed and against upward, swingable displacement relative to magazine M.

Figure 12:
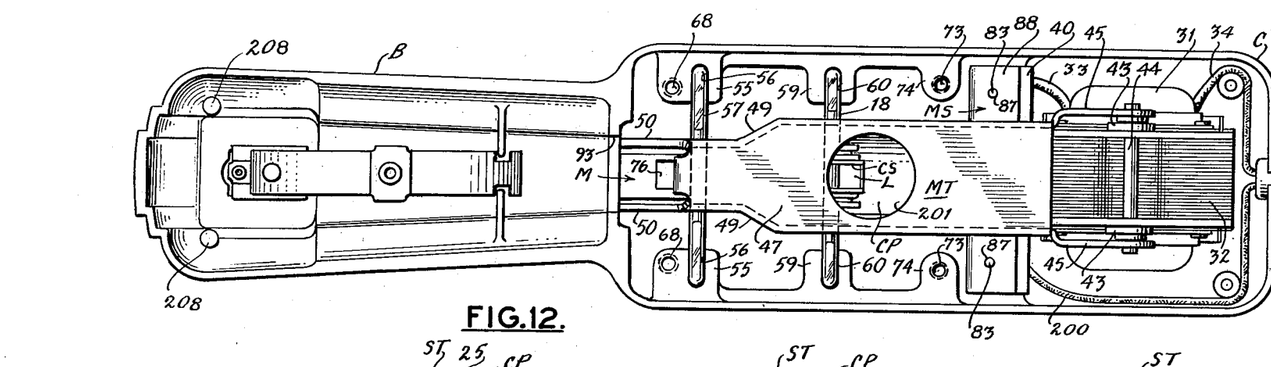
Fig. 12 is a bottom view of Fig. 5 with the channel shaped keeper for the spaced fulcrum pins and channel shaped guard both removed from the casing.
Figure 15:
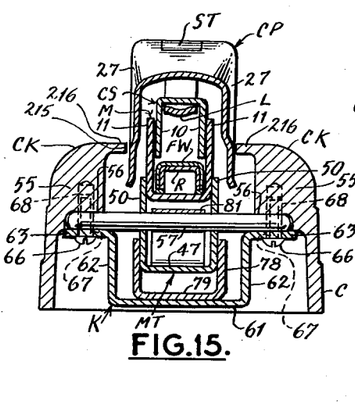
Figures 26, 28, 29:
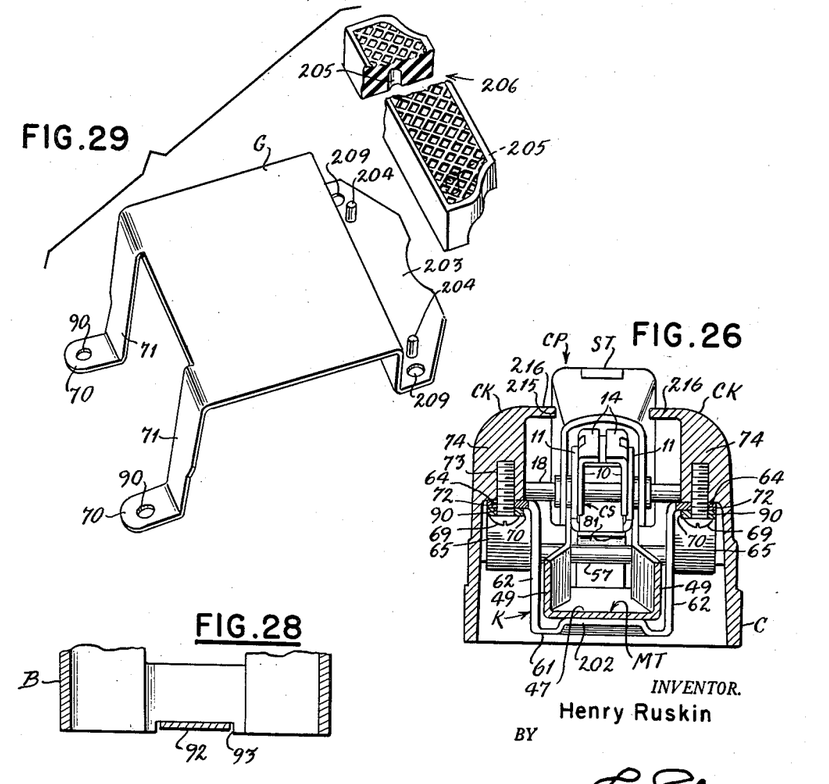
Fig. 26 is a transverse sectional view on the line 26—26 of Fig. 5.
Fig. 28 is a transverse sectional view on the line 28—28 of Fig. 5.
Fig. 29 is an exploded view of the guard and its rubber pad shown broken away.
Figure 27:
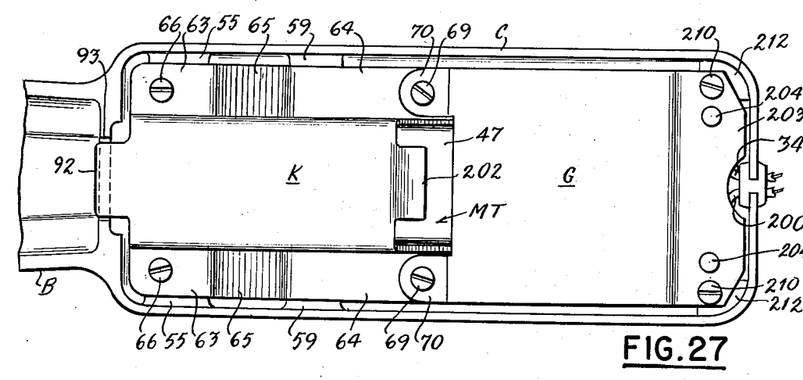
Fig. 27 is a fragmentary bottom view of Fig. 5 but with the rubber pad removed from the guard.

However intervenor MT is also swingably and slidably maintained relative to casing C. In this connection it will be observed that within casing C and integral therewith are spaced bosses 55 having alined grooves 56 (Figs. 5, 12 and 15) for locating and receiving fulcrum pin 57 passing through alined elongated guide slots 58 in spaced extensions 50. It should be noted that casing C also includes transversely alined bosses 59 spaced from and to the rear of alined bosses 55. Interrupting bosses 59 are the alined grooves 60 for locating and receiving fulcrum pin 18 which pivotally carries the rear ends of cap CP, cover CS and magazine M, namely, staple containing arm SA. To maintain fulcrum pins 57 and 18 fixed within grooves 56 and 60, a U shaped metal keeper K (Figs. 13, 15 and 16) is provided. Specifically keeper K includes bottom wall 61 having upstanding spaced sides 62 from which laterally extend spaced flanges 63 and the spaced flanges 64 offset in respect to and to the rear of flanges 63 by the inclined flanges 65. Spaced screws 66 (Fig. 15) pass through elliptical bores 67 (Fig. 13) in flanges 63 to be received in spaced bores 68 for anchoring flanges 63 against bosses 55 to hold fulcrum pin 57 in place in the spaced grooves 56. Screws 69 (Fig. 26) pass through spaced ears 70 of the spaced legs 71 of the guard plate G and through openings 72 in the spaced flanges 64 of the keeper K and into the bores 73 of the spaced bosses 74 to hold flanges 64 against fulcrum pin 18 and in place within alined grooves 60 of spaced bosses 59. By the arrangement disclosed, keeper K may be said to constitute a retainer for holding the spaced fulcrum pins 57 and 18 against bosses 55 and 59 of casing C.

Figures 6, 23, 24:
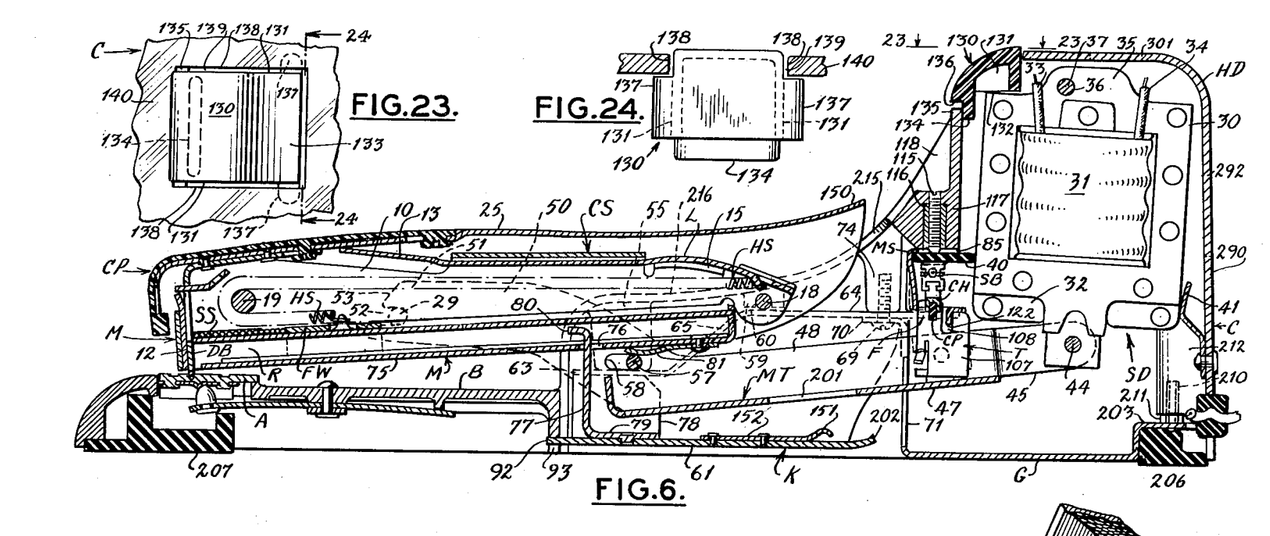
Fig. 6 is a view similar to Fig. 5 however exhibiting the swingable arm which broadly comprises the magazine, the cover for the magazine and cap appropriately depressed to bring about clinching of the foremost staple ejected from the magazine pursuant to the application of a manual thrust against the top part of the cap.
Fig. 23 is a fragmentary enlarged plan view on the line 23—23 of Fig. 6.
Fig. 24 is a transverse sectional view along the line 24—24 of Fig. 23.

Bottom wall 75 of magazine M is provided with an opening 76 (Figs. 5 and 6) for freely receiving extension 77 of the U-shaped metal member 78 having its bottom wall 79 suitably fixedly anchored to bottom wall 61 of keeper K. Extension 78 includes the forwardly overhanging lug 80 disposed within the magazine and serves to restrain or limit upward swingable displacement of the magazine M. Offset leaf spring 81 has its rear end anchored to bottom wall 75 and its free end bears against bottom pin 57, thus normally holding magazine M elevated against lip 80 which in effect constitutes a stop and U-shaped member 78 therefore may be considered as restraining means.

Casing C includes spaced inwardly disposed shoulders 82 (Figs. 5 and 17) having integrally depending spaced pins 83 adapted to be received in the spaced openings 84 (Figs. 17 and 17E) of ears 85 of the metal switch shield MS; in the spaced openings 86 of the insulating switch plate 40, in the spaced openings 87 in the lower wall 88 of shield MS; in the spaced openings 89 of flanges 64 of keeper K; and in spaced openings 90 of ears 70 of guard G.

Helical springs 91 surround spaced pins 83. These springs 91 yieldingly abut insulating plate 40 and the lower wall 88 of shield MS, thus urging plate 40 against ears 85 and the latter against shoulders 82. Since ears 70 of guard G act against flanges 64 of keeper K, flanges 64 support shield MS against downward displacement.

Referring back to keeper K, to facilitate positioning flanges 63 and 64 thereof relative to openings 68 and 73 of bosses 55 and 74 within casing C, bottom wall 61 of keeper K includes tongue 92 receivable in recess 93 to quickly center keeper K about intervenor MT prior to clamping flanges 63 and 64 against casing C.

Microswitch MC (Fig. 17E) is of the conventional normally open type and will be just generally referred. Conducting terminals 93 and 94 carry sockets 95 for electrically grasping the conducting leads 33 and 200. Terminals 93 and 94 extend through insulating plate 40 and project from metal brackets 96 and 97 effectively anchored to insulating plate 40. Bracket 96 carries contact 98. Bracket 97 has the depending fulcrum plate FP suitably pivotally supporting the metal switch blade SB and the swingable actuator 99. Helical spring 100 is connected to the switch blade SB and the rear end of actuator 100. Switch blade SB carries upper and lower contacts 101 and 102. Spring 100 acts on swingable blade SB to normally hold contact 102 away from contact 98 and contact 101 against the insulating projection 103. The switch is thus normally held open. Spring 100 also pivotally retains blade SB against fulcrum plate FP. However according to the invention, pivoted actuator 99 is provided at its front end with a channel shaped metal part CH (Fig. 5) appropriately straddling and anchored to the stiff cam plate CP having the cam surface 104. Cam plate or cam CP is preferably of a suitably hard insulating material such as nylon strip while insulating plate 40 is preferably of Bakelite strip.

Figure 20:
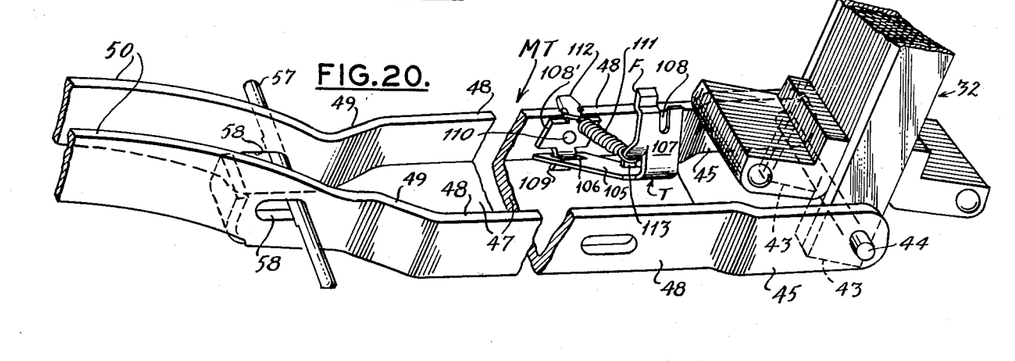
Fig. 20 is an enlarged fragmentary broken perspective view of the intervenor to which both the trigger and swingable armature are each swingably connected.
Figures 21, 21A:
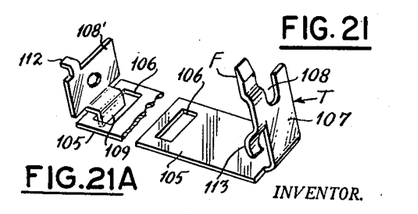
Fig. 21 is a perspective view of the trigger.
Fig. 21A is a perspective view showing the trigger pivotally retained by its anchoring plate.

Swingably carried by the intervenor MT is the pivoted trigger generally designated T having finger F coacting with cam plate CP to operate the pivoted actuator 99 against the resistance of spring 100 to pivotally swing blade SB downwardly from its normal open position at which time contact 102 is spaced from contact 98 to the closed position where contact 102 engages contact 98 to close the electrical circuit containing solenoid SD. Trigger T is a bent metal member including bottom part 105 containing slot 106 and the upright bifurcated part 107 which includes finger F and slot 108. As shown, finger F is offset from the body of part 107 (Figs. 20, 21 and 21A). Forming the pivotal connection for trigger T is the plate 108' having depending lug 109 fitting in slot 106. Plate 108' is anchored by rivet 110 to one of the side walls 48 of the motion transmitter MT. Normally contracted helical spring 111 has its ends retained by lugs 112 and 113 of plate 108 and trigger part 107 which is substantially normal to the bottom part 105. Thus spring 111 normally holds trigger T raised and finger F near crotch 114 (Fig. 17) adjacent to cam face 104 of cam plate CP. In this relation, contact 102 is away from contact 98, and the electrical circuit for the solenoid is open or broken.

Of importance, it should be realized that the microswitch MC may be advanced towards or away from trigger T to obtain instant closing of the electrical circuit containing the solenoid promptly after cap or head CP has received a manual downwardly directed thrust to swingably displace the intervenor MT, that is, if a downwardly directed force as indicated by the vertical arrow W (Fig. 5) be applied to cap CP, spaced posts 29 move downwardly to abut the lower faces of slots 52 of spaced jaws 51, whereby extensions 50 move downwardly and the intervenor MT is pivoted about the fulcrum pin 57, hence causing the rear part of this intervenor to be raised and if the intervenor be raised, the swingable trigger T is correspondingly elevated thereby causing the pivoted finger F to operate against cam surface 104 of cam plate CP. Consequently cam plate CP is swung upwardly against the resistance of spring 100 and switch blade SB is instantaneously swung downwardly causing contact 102 to engage contact 98, thus closing the electrical circuit for solenoid SD.

As previously stated, microswitch MS may be advanced or retarded to provide for prompt closing of the electrical circuit instantly pursuant to the application of force W on cap or head CP. In this connection, the adjustable set screw 115 is utilized. This set screw is threadably associated with the internally threaded ferrule 116 which is appropriately fixed within boss 117 integral with casing C. Set screw 115 is conveniently accessible from the outside of casing C and its slotted head may be reached through recess 118. If rotated in one direction, set screw 115 depresses the switch insulating plate 40 against the resistance of springs 91, causing crotch 114 to move towards finger F and if rotated in an opposite direction, crotch 114 moves away from finger F until the insulating ears 85 of metal switch shield MS meet bottom horizontal stop faces of spaced shoulders 82. In other words, microswitch MS may be adjusted to take up the uncontrollable manufacturing tolerances inherent in the various moving parts of the herein stapling machine, for example, of the trigger T, of the intervenor MT, of cap CP etc. to provide for instant closing of the switch as desired on application of thrust W (Fig. 5) on head or cap CP. Preferably one of the springs 91 about depending pins 83 is slightly stronger than the other, to provide for slight tilting of the insulating plate 40 as illustrated in Fig. 17D on adjustment of set screw 115.

Figure 17:
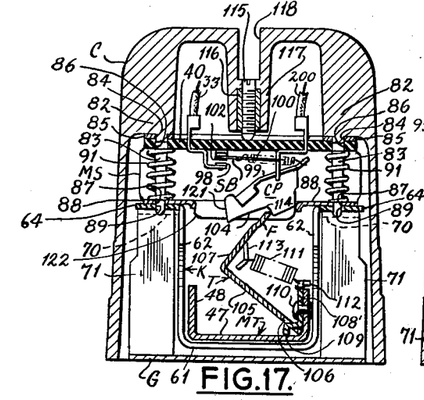
Fig. 17 is a transverse sectional view on the line 17—17 of Fig. 5 illustrating the swingable trigger carried by the intervenor in its normal inactive position at which time the microswitch holds open the electrical circuit containing the solenoid.
Figure 17A:
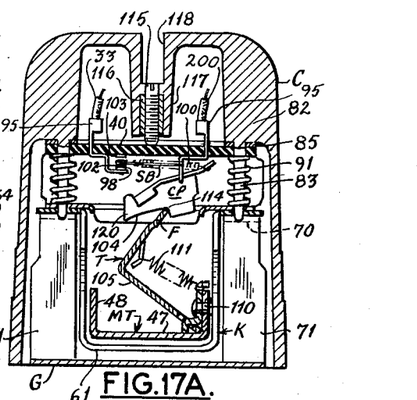
Fig. 17A is a view similar to Fig. 17, however, showing the swingable blade of the microswitch closed for completing the electrical circuit containing the solenoid as the rear part of the slidable and swingable intervenor is elevated pursuant to slight manual thrust or impact applied downwardly against the front top part of the cap.
Figure 17B:
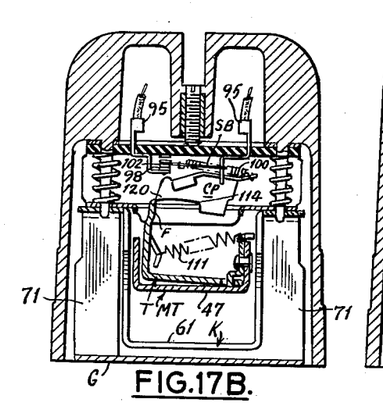
Fig. 17B is a view similar to Fig. 17A illustrating the microswitch still closed but with the swingable trigger about the trip from the pivoted actuator of the snap switch.
Figure 17C:
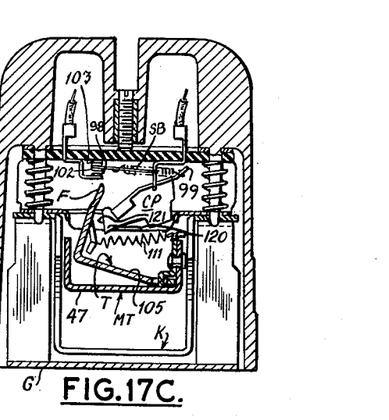
Fig. 17C is a view along the lines of Fig. 17B, exhibiting the trigger which operates the pivoted actuator of the microswitch in the open circuit position after initial closing of the microswitch and prior to the return of the switch to normal inoperative position.
Figures 17D, 17E:
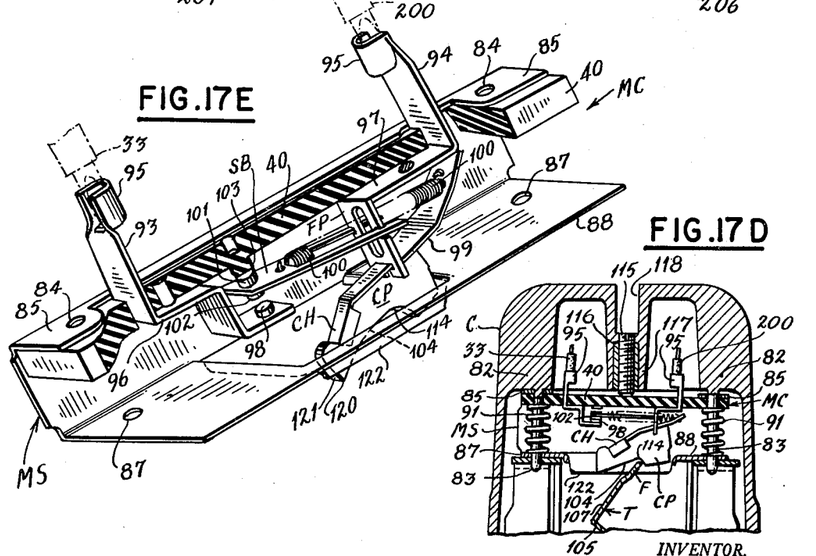
Fig. 17D is a view similar to Fig. 17A but with the switch plate or mount adjusted or regulated and now biased for proper timing to compensate for tolerances in the herein electric stapling machine incident to manufacture and assembly.
Fig. 17E is an enlarged broken perspective view of the normally open microswitch disposed within its metal shield.
Figures 18, 19:
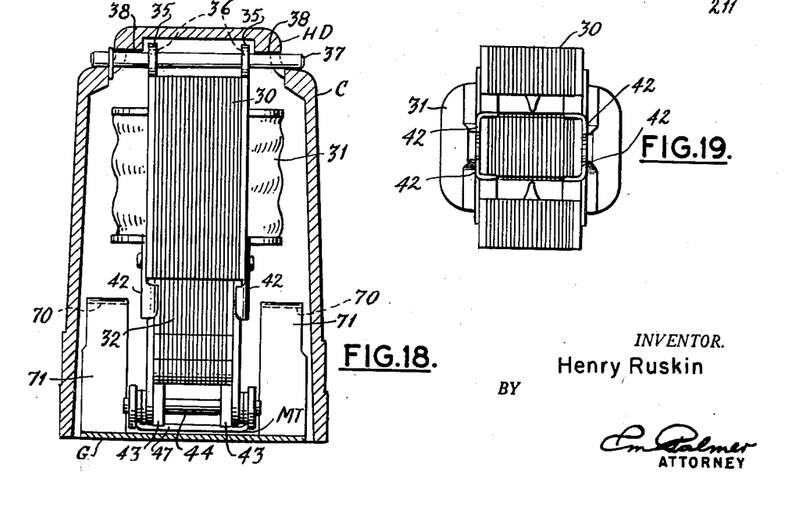
Fig. 18 is a transverse sectional view substantially on the line 18—18 of Fig. 5.
Fig. 19 is a bottom view looking inside of the solenoid frame or core with its armature removed.

In Figs. 17 to 17D left hand spring 91 is slightly larger than the right hand spring 91, that is, the left hand spring has been made stronger than the one at the right, permitting tilting of the right part of the insulating 40 while the left part thereof remains unaffected. Such unbalanced relation of springs 91 is desirable, for in actual practice, it is difficult to obtain springs of exactly the same strength, and consequently by deliberately utilizing one slightly weaker spring, the direction of tilt of insulating plate 40 is known in advance as desired.

According to the invention cap or head CP must be first depressed slightly but manually to close the electric circuit for solenoid SD, that is, cause intervenor MT to mits its motion, raising trigger T to operate switch blade SB. Only a slight touch or impact on head or cap CP is necessary to initiate such action for ultimately throwing switch blade SB from its circuit breaking to its making position. Once the electrical circuit is made or closed by switch blade SB, subsequent operations necessary in the matter of driving the foremost staple of staple strip SS out of magazine M are automatic. For example, in Fig. 17A, finger F is at the crotch 114, and switch blade SB has closed the solenoid circuit. With the circuit closed, the solenoid is energized and armature 32 is drawn within the solenoid coil 31, hence the rear end of the swingable intervenor MT is raised, and the bifurcated jaws 51 are caused to move downwardly, thus driving spaced pins 29 downwardly, whereby cap CP (Fig. 6) is driven downwardly against the resistance of leaf spring L. If cap CP is driven downwardly, driving blade DB is likewise shifted downwardly and causes the foremost staple in raceway 12 to be driven against anvil A at the front part of base B for fastening purposes as is well understood.

After the solenoid circuit has been established, the rear end of intervenor MT continues to move upwardly, that is, away from wall 61 of keeper K. This action causes trigger T to pivot downwardly towards bottom wall 47 against the resistance of spring 111 as illustrated in Fig. 17B and during this interval, finger F yieldingly moves against cam face 104 thereby swinging cam CP upwardly for holding contact 102 against contact 98 to hold the switch closed until the staple driving blade DB now moving downwardly has completed approximately eighty percent of its driving stroke at which time finger F has reached nose 120 of cam plate CP and is ready to trip from the latter (Fig. 17B). Instantly thereafter, finger F pivots about nose 120 but is held against face 121, and spring 100 automatically acts on actuator 99 to swing blade SB upwardly to remove contact 102 from contact 98, hence breaking the electrical circuit including solenoid SD to deenergize the latter. Driving blade DB however continues to move downwardly because of its own momentum to complete its downstroke to drive the foremost staple out of magazine M and against anvil A. Immediately after finger F of the spring controlled swingable trigger T leaves nose 120 of cam CP, spring 111 automatically retracts trigger T, causing finger F to yieldingly bear against end face 121. Since solenoid SD is now deenergized, armature 32 drops because of its own weight, causing intervenor MT to swing in a counter direction, causing jaws 51 to shift upwardly, thus driving posts 29 of cap CP upwardly to pivotally elevate cap CP and consequently cover or case CS and magazine M until bottom wall 75 of magazine M strikes stop or restraining lug 80 and leaf spring 81 acting on fulcrum pin 57 yieldingly holds the magazine against stop 80, that is, in its normally raised position shown in Fig. 5. During this cycle of operation, solenoid SD swings rearwardly against the resistance of leaf spring 41 during downward displacement of blade DB and on the return or up stroke of blade DB spring 41 urges solenoid core 30 to swing forwardly, that is, in a direction towards magazine M until core 30 meets insulating plate 40, thereby armature 32 acts to hold intervenor MT yieldingly and rotatably against fulcrum pin 57.

To preclude needless side sway of trigger T as it swings, metal shield MS includes a depending flange or rail 122 received in guide slot 108 of the trigger. Also finger F clears end face 121 of cam CP as intervenor MT drops to its normal position shown in Fig. 17 and returns automatically to its inactive position also shown in Fig. 17 due to contraction of spring 111.

Figure 22:
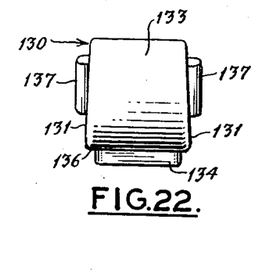
Fig. 22 is a front elevational view of the manipulator for swingably shifting the solenoid which in turn operates the swingable and slidable intervenor to disengage the jaws of the latter from the cap.

Normally magazine M is held closed by cover or case CS and spaced bifurcated jaws 51 removably embrace the spaced posts 29 of cap CP. Thus cap CP cannot be swung upward to lift cover CS from magazine M since it is first necessary to withdraw jaws 51 of the intervenor MT away from and be free of posts 29 of cap CP. This is accomplished by depressing manipulator 130 which has its spaced sides 131 seated on the top flat surface 132 of an adjacent corner of the swingable solenoid core or frame 30. Depending from the front arcuate wall 133 of manipulator 130 and merging with spaced sides 131 thereof is lug 134 loosely and slidably disposed in the back of lip 135 which is integral with casing C. Lug 134 and the arcuate front wall 133 define the horizontal shoulder 136 normally spaced from the upper wall of lip 135. Projecting laterally of and integral with spaced sides 131 of manipulator 130 (Figs. 22 to 24) are the spaced ribs 137 which are under and extend beyond spaced sides 138 of opening 139 interrupting stop top wall 140 of casing C, the arrangement being such that manipulator 130 is loosely retained within opening 139 and that bottom faces of top wall 140 of casing C limit upward displacement of manipulator 130 at which time lip 135 serves as a stop to hold lug 134 from removal or falling forwardly through opening 139.

Figure 1:
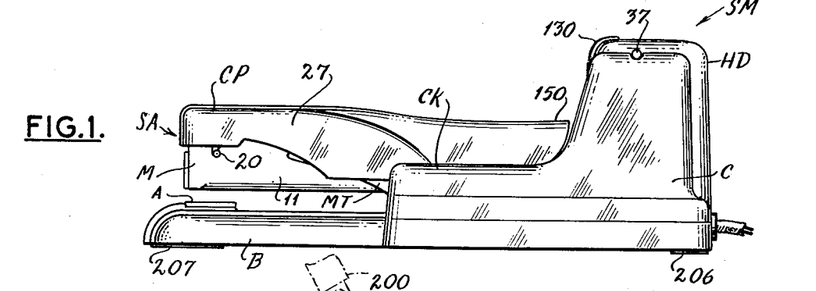
Fig. 1 is a side elevational view of the electric stapling machine according to my invention.
Figure 3:
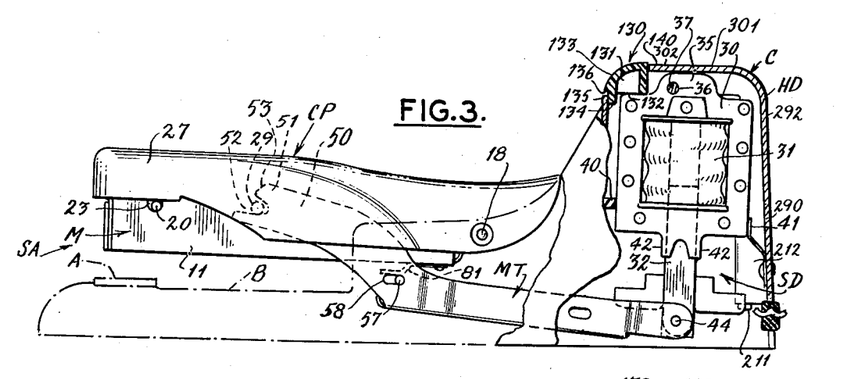
Fig. 3 is a view similar to Fig. 1 however partly broken away and partly in section to illustrate the normally biased eccentrically mounted or swingable solenoid and its slidable armature in their normal positions at which time spaced bifurcated jaws of the slidable and pivoted intervenor which is pivotally associated with the lower end of the armature, removably engage the cap of the stapling machine to hold the magazine of the latter closed.
Figure 4:
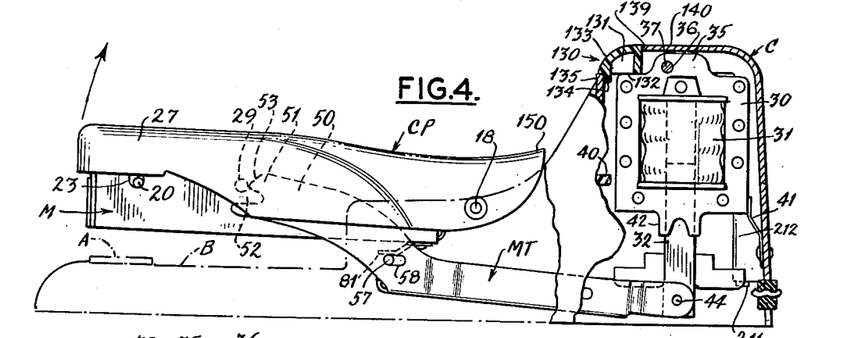
Fig. 4 is a view along the lines of Fig. 3 showing the solenoid swung rearwardly and the slidable and pivoted intervenor disengaged from the cap to permit the latter to be swung upwardly and rearwardly to open the magazine.

In Figs. 1, 3 and 5, core 30 of solenoid SD hangs eccentrically, that is obliquely being held against the insulating plate or switch mount 40 by spring 41. Intervenor MT is in its most forward position with the rear ends of slots 58 against fulcrum pin 57 and bifurcated jaws 51 embrace or straddle driven pins 29 of cap or head CP and the driving blade DB is raised slightly above staple strip SS. For purposes of specification cap CP and its driving blade DB may be considered as plunger means for driving the foremost staple element out of the magazine against anvil A. With jaws 53 embracing posts 29 of cap CP, this cap cannot be opened or swung to the open positions shown in Figs. 8 and 9. This can be achieved only by applying downwardly directed finger pressure against top wall 133 of manipulator 132 to withdraw the transversely spaced bifurcated jaws 51 rearwardly to clear posts 29. By such action, manipulator 130 bears firmly against face 132 of core 30, causing core 30 to swing rearwardly against the resistance of spring 41. By this action the pivoted armature is also shifted rearwardly, thereby causing intervenor MT to be slidably displaced rearwardly until corresponding front ends of slots 58 abut fulcrum pin 57. When this occurs jaws 51 are completely disengaged from the spaced posts 29 (Fig. 4). Cap CP can thus be fully opened to reach the position shown in Figs. 8 and 9 to permit full access to the interior staple receiving channel of magazine M and to the fixed rail R therein for prompt loading of a new staple strip in the magazine. Since the ends of spring HS are retained by the slidable follower FW and to rear end of spring L follower FW automatically moves to the rear of magazine M when cap CP is fully opened. When the cover is closed follower FW automatically moves forwardly along the rail R to abut the rear end of the staple strip SS to always urge this strip towards raceway 12. Cap CP when fully opened (Fig. 9) is automatically held in such position in that the tail end 150 thereof has snapped over and is disengageably retained by detent 151 of leaf spring 152 appropriately anchored to bottom wall 61 of keeper K.

After loading of magazine M, if a forwardly directed thrust be applied against cap CP, such action automatically disengages tail portion 150 from spring detent 151 and cap CP together with its cover CS swing downwardly automatically counter to the direction of the arrow illustrated in Fig. 4 to close magazine M at which time posts 29 of cap CP strike cams 53 of jaws 51, shifting intervenor MT bodily rearwardly against resistance of leaf spring 41 (Fig. 4) to slip under cams 53 to be again removably received by the aligned walls of slots 52 and thereafter spring 41 recoils to shift intervenor MT bodily forwardly whereby walls of slots 52 interlock with posts 29 to hold cap CP closed. Also on closing of cap CP, pins 20 of roller 19 automatically pass under alined nose portions 22 to be received in alined notches 23, thus holding cover CS against accidental opening.

It should be noted however that on opening of cap CP (Fig. 9) opening 201 in bottom wall 47 of intervenor MT permits tail 150 to pass through wall 47 to reach detent 151. Bottom wall 61 of keeper K is provided at its rear end with lip 202 to serve as an intermediate support or stop for intervenor MT.

Figures 1A, 10:
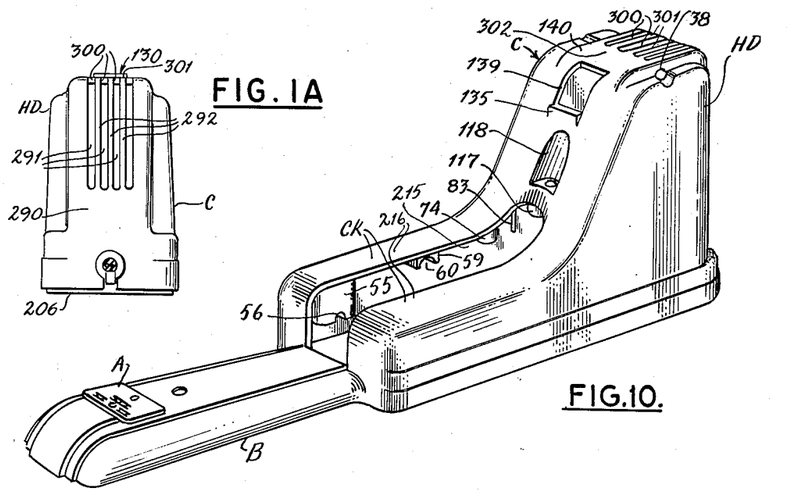
Fig. 1A is a rear view of Fig. 1.
Fig. 10 is an enlarged perspective view of the die cast hollow casing.

Guard G is provided with flange 203 having posts 204 received in spaced openings 205 for frictionally gripping and holding rear rubber pad 206 in place. Front rubber pad 207 is appropriately retained on depending posts 208 (Fig. 12) of base B. Spaced openings 209 (Fig. 29) receive screws 210 to clamp flange 203 against spaced reduced portions 211 of corner bosses 212 integral with casing C which includes the spaced cheeks CK forming forming the throat or channel 215 in which the rear part of the swingable arm SA is movably guided and in fact spaced bosses 55, 59, and 74 (Fig. 10) be said to depend from the spaced top walls 216 of cheeks CK, walls 216 forming throat 215.

Conducting wires 34 and 200 (Fig. 12) are appropriately arranged across a source of electrical potential and current flows through wire 34, solenoid core 31, through lead 33, terminal 93 to contact 98 and through contact 102 after switch MC is closed, across switch blade SB to fulcrum plate FP and through actuator 99 and spring 100 to terminal 94 and from the latter to the return conductor or wire 200, thus establishing or completing the electrical circuit for solenoid SD.

Figure 2:
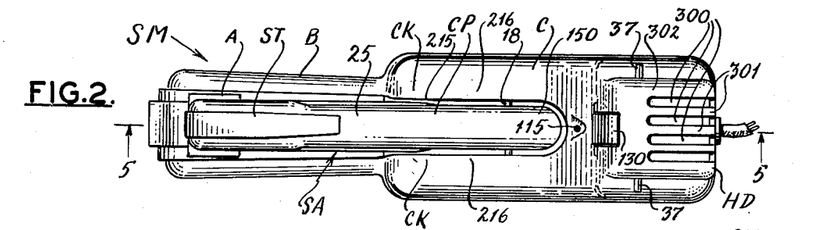
Fig. 2 is a plan view of Fig. 1.

To facilitate cooling of casing C during operation, rear wall 290 (Fig. 1A) of hood HD is interrupted by vertical and spaced slots 291 forming spaced vertical bars 292. Horizontal ventilating gaps 300 (Fig. 2) form spaced horizontal bars 301 interrupting top wall 302 of hood HD.

If no work be interposed between anvil A and magazine M (Fig. 6) and the stapling machine is operated (Fig. 6) the foremost staple S will be clinched against the anvil at which time stepped armature 32 is limited in upward movement by core or frame 30 which acts as a stop.

Various changes may be made in details of construction and arrangement of parts without departing from the spirit of the invention or sacrificing any of the advantages thereof inherent therein.

I claim:

1. In an electric stapling machine, a casing, a staple containing arm comprising a magazine for receiving a staple strip and a liftable cover for opening and closing said magazine and including normally raised but depressible plunger means carrying a staple ejecting blade for driving the foremost staple of said strip out of said magazine, a solenoid including a core, coil and a vertically guided armature; an electric circuit including said coil, spring controlled switch means interposed in said circuit to normally hold said circuit open, an intervenor having a rear part pivotally connected to the lower part of said armature, means associated with said casing for pivotally supporting said intervenor intermediate the front and rear ends thereof, said intervenor having at its front end means for removably engaging and driving said cover to operate said plunger means, and means effective pursuant to application of finger pressure on said cover for actuating said switch means to close said circuit and activate said solenoid so that stapling may occur.

2. An electric stapling machine comprising, a casing, a solenoid within said casing and having an armature, a normally open switch in circuit with said solenoid, manipulatable means embodying a staple carrying arm including a staple receiving magazine and staple ejecting plunger means having a cap, means within said casing for pivotally sustaining said arm, an intervenor interposed between said armature and cap, a pivoted connection between said intervenor and armature, means within said casing for tiltably supporting said intervenor, and a swingable connection between said intervenor and cap for tiltably displacing said intervenor upon application of downwardly directed pressure on said manipulatable means so as to close said switch and activate said solenoid.

3. An electric stapling machine comprising, a casing, a solenoid within said casing and having an armature, a normally open switch in circuit with said solenoid, manipulatable means embodying a staple carrying arm including a staple receiving magazine and staple ejecting plunger means having a cap including projecting intervenor engaging means, means within and held against said casing for pivotally sustaining said arm, an intervenor interposed between said armature and cap and including spaced jaws having aligned gaps removably receiving said intervenor engaging means, a pivoted connection between said intervenor and armature, means within and held against said casing for tiltably supporting said intervenor, the walls of said gaps and said impelling means defining a swingable connection between said intervenor and cap for tiltably displacing said intervenor upon application of downwardly directed pressure on said manipulatable means so as to close said switch and actuate said solenoid.

4. An electric stapling machine comprising, a casing, a solenoid within said casing and having an armature, a normally open switch within said casing and in circuit with said solenoid, manipulatable means embodying a staple carrying arm including a staple receiving magazine and staple ejecting plunger means having a cap, means within said casing for pivotally sustaining said arm, an intervenor interposed between said armature and cap, switch closing means carried by said intervenor and normally spaced from said switch, means within said casing for tiltably supporting said intervenor, and a swingable connection between said beam and cap for tiltably displacing said intervenor upon application of downwardly directed pressure on said manipulatable means for elevating said switch closing means to close said switch and activate said solenoid.

5. An electric stapling machine comprising, a casing, a solenoid within said casing and having an armature, a normally open switch in circuit with said solenoid, manipulatable means embodying a staple carrying arm including a staple receiving magazine and staple ejecting plunger means having a cap including intervenor engaging means, means within said casing for pivotally sustaining said arm, an intervenor interposed between said armature and cap and including spaced jaws having aligned means disengageably interlocking with said intervenor engaging means, a pivoted connection between said intervenor and armature, means within said casing for tiltably supporting said intervenor, said aligned means and intervenor engaging means defining a swingable detachable connection between said intervenor and cap for tiltably displacing said intervenor upon application of downwardly directed pressure on said manipulatable means so as to close said switch and actuate said solenoid, and spring means to maintain said jaws interlocked with said intervenor engaging means.

6. An electric stapling machine comprising, a casing, a solenoid within said casing and having an armature, a normally open switch in circuit with said solenoid, manipulatable means embodying a staple carrying arm including a staple receiving magazine and staple ejecting plunger means having a cap including intervenor engaging means, means connected to said solenoid and held by said casing for eccentrically sustaining said solenoid, means within said casing for pivotally sustaining said arm, an intervenor interposed between said armature and cap and including spaced jaws having aligned means disengageably interlocking with said intervenor engaging means, a pivoted connection between said intervenor and armature, means within said casing for tiltably supporting said intervenor, said aligned means and intervenor engaging means defining a swingable detachable connection between said intervenor and cap for tiltably displacing said beam upon application of downwardly directed pressure on said manipulatable means so as to close said switch and actuate said solenoid, and means to normally maintain said jaws interlocked with said intervenor engaging means.

7. An electric stapling machine comprising a casing having spaced cheeks defining a channel in part longitudinally interrupting said casing, a solenoid within said casing and having an armature, a normally open switch in circuit with said solenoid, manipulatable means embodying a staple carrying arm in part receivable in said channel and in part overhanging said cheeks and including a staple receiving magazine, a cap thereabove and staple follower means therewithin, means within said casing for pivotally sustaining said arm within said channel, an intervenor interposed between said armature and channel, a pivoted connection between said intervenor and armature, means within said casing and traversing said channel for tiltably supporting said intervenor, and a swingable connection between said intervenor and cap for tiltably displacing said intervenor upon application of downwardly directed pressure upon said manipulatable means so as to close said switch and actuate said solenoid.

8. An electric stapling machine comprising a downwardly movable staple receiving magazine, an anvil spaced below said magazine, staple follower means within said magazine, a downwardly movable cap member carried by said magazine having staple ejecting plunger means at its forward portion, an engageable member upon said cap, a pivotally movable intervenor operatively connected to said engageable member, means normally holding said intervenor in inoperative position, electrical driving means in circuit with said intervenor, and switch means in circuit with said electrical driving means for actuating and thence disengaging the same so as to cause said intervenor to operate and thence return to inoperative position.

9. An electric stapling machine comprising a downwardly movable staple receiving magazine, an anvil spaced below said magazine, a spring actuated staple follower member within said magazine, a pivotally and downwardly movable cap member secured to said magazine and having staple ejecting plunger means at its forward portion, an engageable member upon said cap, a pivotally movable intervenor operatively connected at one end thereof to said engageable member, means normally holding said intervenor in inoperative position, a solenoid having an armature pivotally connected to said intervenor at the other end thereof, and switch means in circuit with said solenoid for actuating and thence disengaging the same so as to cause said intervenor to operate and return to inoperative position so as to activate and disengage said solenoid, and thus cause stapling to occur.

10. An electric stapling machine comprising a downwardly movable staple receiving magazine, an anvil spaced below said magazine, a staple receiving raceway within said magazine, a spring actuated forwardly movable follower within said raceway, a pivotally and downwardly movable cap member secured to said magazine and having staple ejecting plunger means at its forward portion, a post on each side of said cap, a pair of pivotally movable angularly disposed intervenors each operatively connected at one end thereof to one of said posts, a solenoid having an upwardly movable armature pivotally connected to the other end of each of said intervenors, a weighted portion at the bottom of said armature, and switch means in circuit with said solenoid for actuating and thence disengaging the same so as to cause said intervenors to operate and thence return to normal inoperative position so that stapling occurs.

11. An electric stapling machine comprising a downwardly movable staple receiving magazine, an anvil spaced below said magazine, a staple receiving raceway within said magazine, a spring actuated forwardly movable follower within said raceway, a pivotally and downwardly movable cap member secured to said magazine having a staple ejecting plunger at its forward portion, a post on each side of said cap, a pair of pivotally movable angularly disposed intervenors each operatively connected at one end thereof to one of said posts, a solenoid having an upwardly movable armature pivotally connected to the other end of each of said intervenors, a weighted portion at the bottom of said armature, switch means in circuit with said solenoid, and cam means operatively connected to said switch means for actuating and disengaging the same so as to cause said intervenors to operate and return to inoperative position and thus cause stapling to occur.

12. An electric stapling machine comprising a casing having spaced cheeks at its front portion defining a channel in part longitudinally interrupting said casing, a downwardly movable staple receiving magazine forwardly disposed with respect to said casing and having its rear portion thereof pivotally secured within said channel, an anvil spaced below said magazine, a staple receiving raceway within said magazine, a spring actuated forwardly movable follower within said raceway, an openable cap member disposed above said magazine and movable both upwardly and downwardly, said cap member being secured to said magazine at its rear portion and having staple ejecting plunger means at its forward portion, a post secured to said cap member on each side thereof, a pair of pivotally movable angularly disposed intervenors each operatively connected at one end thereof to one of said posts, a solenoid having an upwardly movable armature disposed within said casing and pivotally connected to the other end of each of said intervenors, a weighted portion at the bottom of said armature, switch means within said casing in circuit with said solenoid, and cam means operatively connected to said intervenors and operated by movement of said cap member for actuating said switch means and thence disengaging the same so as to cause said intervenors to operate and thence return to inoperative position so that stapling occurs.

13. An electric stapling machine comprising a casing having spaced cheeks at its front portion defining a channel in part longitudinally interruping said casing, a downwardly movable staple receiving magazine forwardly disposed with respect to said casing and having its rear portion thereof pivotally secured within said channel, an anvil spaced below said magazine, a staple receiving raceway within said magazine, a spring actuated forwardly movable follower within said raceway, an openable cap member disposed above said magazine and movable both upwardly and downwardly, said cap member being secured to said magazine at its rear portion, a staple ejecting plunger member secured to said cap member at the front portion thereof, a projecting post on each side of said cap member, a pair of pivotally movable angular disposed intervenors each operatively connected at one end thereof to one of said posts, a solenoid having an upwardly movable armature pivotally connected to the other side of each of said intervenors and pivotally secured within said casing, a weighted portion at the bottom of said armature, switch means within said casing in circuit with said solenoid, said switch means having a spring controlled trigger portion, a swingable cam formed with a projecting nose portion operatively connected to said trigger, said cam being also operatively connected to said cap member and actuated by initial depression of the same, so that initial depression of said cap member will actuate said switch means and thence disengage the same so as to cause said intervenors to operate and thence return to inoperative position so that stapling occurs.

14. An electric stapling machine comprising a casing having spaced cheeks at its front portion defining a channel in part longitudinally interrupting said casing, a downwardly movable staple receiving magazine forwardly disposed with respect to said casing and having its rear portion pivotally secured within said channel; an anvil spaced below said magazine, a staple receiving raceway within said magazine, a spring actuated forwardly movable follower within said raceway, an openable cap member disposed above said magazine and pivotally movable about said magazine both upwardly and downwardly, said cap member being secured to said magazine at its rear portion, a staple ejecting plunger member at the forward portion of said cap and secured thereto, a projecting post on each side of said cap, a pair of pivotally and slidably movable angularly disposed intervenors each formed with a nose portion and provided with a recess at one end thereof to accommodate one of said posts, a solenoid pivotally and eccentrically secured within said casing and having an upwardly movable armature secured to the other end of each of said intervenors, a weighted portion at the bottom of said armature, a switch in circuit with said solenoid within said casing, said switch including a spring controlled trigger member, a swingable cam within said casing operatively connected to said intervenors, said cam including a projecting nose portion, wherein said cam is actuated by initial depression of said cap member and causes said switch to be actuated and disengaged so that said intervenors operate and return to inoperative position so that stapling occurs.

15. In an electric stapling machine having an open staple receiving magazine and a pivotally movable openable cap member thereabove the improvement which comprises a projecting post secured to said cap member and a pivotally and slidably movable intervenor formed with a nose portion and provided with a recess therewithin to accommodate said post.

16. In an electric stapling machine having an open staple receiving magazine and a pivotally movable openable cap member disposed thereabove the improvement which comprises a projecting post secured on each side of said cap member and a pair of pivotally and slidably movable intervenors each formed with a nose portion and provided with a forwardly open recess therewithin to accommodate one of said posts, and wherein said intervenors may be slid back so as to permit said posts to clear the nose portions of said intervenors and permit loading of the machine.

17. In an electric stapling machine having an open staple receiving magazine and a pivotally movable openable cap member disposed thereabove and secured to said magazine, the improvement which comprises a projecting post secured to one side of said cap member, a pivotally and slidably movable intervenor formed with a nose portion and provided with a recess therewithin to accommodate said post, a pivotally and eccentrically mounted solenoid having an armature pivotally secured to the other end of said intervenor, and means for slidably moving said intervenor and pivotally moving said solenoid so as to permit said post to clear the nose portion of said intervenor and thus permit loading of the device.

References Cited in the file of this patent

UNITED STATES PATENTS

| | | |
|---|---|---|
| 2,569,220 | Batten | Sept. 25, 1951 |
| 2,643,307 | Geel | June 23, 1953 |
| 2,717,382 | Ruskin | Sept. 13, 1955 |
| 2,796,607 | Filsinger | June 25, 1957 |